(12) United States Patent
Lin

(10) Patent No.: US 6,226,841 B1
(45) Date of Patent: May 8, 2001

(54) WRAPPING STRUCTURE FOR AN END OF A ROPE

(76) Inventor: Chia lu Lin, P.O. Box 2103, Taichung (TW)

( * ) Notice: Subject to any disclaimer, the term of this patent is extended or adjusted under 35 U.S.C. 154(b) by 0 days.

(21) Appl. No.: 09/374,533

(22) Filed: Aug. 16, 1999

(51) Int. Cl.[7] .................................................. F16G 11/06
(52) U.S. Cl. .................. 24/115 R; 24/135 R; 24/135 N; 24/265 EE
(58) Field of Search ............................ 24/115 R, 135 R, 24/135 N, 135 A, 265 EE

(56) References Cited

U.S. PATENT DOCUMENTS

| | | | |
|---|---|---|---|
| 1,052,551 | * | 2/1913 | Zeller .................................. 24/115 R |
| 1,573,737 | * | 2/1926 | Norman .............................. 24/115 R |
| 2,032,567 | * | 3/1936 | Fiege .................................. 24/115 R |
| 2,493,855 | * | 1/1950 | Bucks .................................. 24/15 N |
| 5,119,607 | * | 6/1992 | Horning et al. .................... 24/115 R |

* cited by examiner

Primary Examiner—Victor N. Sakran
(74) Attorney, Agent, or Firm—Rosenberg, Klein & Lee

(57) ABSTRACT

A wrapping structure for an end of a rope, includes an embracing sheath and an end cap. The embracing sheath serves to embrace the end section of the rope. One end of the sheath distal from the end cap is embossed to form a binding section fitted in a receptacle of the end cap. A center of the end face of the sheath is formed with an inward extending thread hole. The end cap is formed with a through hole. A bolt is passed through one end of a fixing section of the end cap and a through hole thereof to be screwed and fixed in the thread hole of the sheath received in the receptacle. The embracing sheath wraps and binds the end section of the rope and the bolt locks the embracing sheath with the end cap. In addition, the bolt stretches the end section of the rope outward so as to more firmly engage the rope with the embracing sheath. Therefore, when a user holds the rope, the end cap is able to effectively stop the hand of the user from axially slipping from the rope.

1 Claim, 5 Drawing Sheets

WRAPPING STRUCTURE FOR AN END OF A ROPE

BACKGROUND OF THE INVENTION

The present invention relates to a wrapping structure for an end of a rope, and more particularly to a wrapping structure which is able to firmly embrace and fix the end section of the rope and prevent the hand of a user from axially slipping from the rope when holding the rope.

FIGS. 4 and 5 show a conventional wrapping structure for an end of a rope. An adhesive tape 91 is wound around the end of the rope 9 to avoid scattering thereof. Then the end is damped with a glue and plugged into a socket 93 of an end cap 92. A screw 94 is screwed into the end cap from the other end for stretching the end of the rope 9 to abut against the inner wall of the socket 93 and fix the end of the rope 9 with the end cap 92.

When held by a user, the end cap 92 serves to stop the rope from axially slipping from the user's hand. Therefore, the end cap 92 will suffer considerably great axial force. The end cap 92 is fixed with the rope 9 by two forces, that is, the frictional force between the end of the rope 9 and the inner wall of the socket 93 and the adhesion force of the glue. The inner wall of the socket 93 has smooth wall face so that the above two fixing forces can hardly resist against the axial force exerted onto the end cap 92. In the case that the end cap 92 is subject to greater axial force, the end of the rope 9 tends to detach from the socket 93 of the end cap 92. At this time, the user's hand will slip from the rope 9 and may get hurt.

SUMMARY OF THE INVENTION

It is therefore a primary object of the present invention to provide a wrapping structure for an end of a rope, in which an embracing sheath serves to embrace and tightly bind the end section of the rope. A bolt serves to lock the embracing sheath with the end cap. In addition, the bolt stretches the end section of the rope outward so as to more firmly engage the rope with the embracing sheath. Therefore, when a user holds the rope, the end cap is able to effectively stop the hand of the user from axially slipping from the rope.

According to the above object, the wrapping structure for an end of a rope of the present invention includes an embracing sheath and an end cap. The embracing sheath serves to embrace the end section of the rope. One end of the sheath distal from the end cap is embossed to form a binding section. A center of the end face of the sheath is formed with an inward extending thread hole. The end cap is formed with a through hole. One end of the through hole is formed with a large diameter receptacle for receiving the sheath therein. The other end of the through hole is disposed with a fixing section having a diameter larger than that of the through hole while smaller than that of the receptacle. A bolt is passed through one end of the fixing section and the through hole to be screwed and fixed in the thread hole of the sheath in the receptacle.

The present invention can be best understood through the following description and accompanying drawings wherein:

DETAILED DESCRIPTION OF THE PREFERRED EMBODIMENTS

Figure 1:
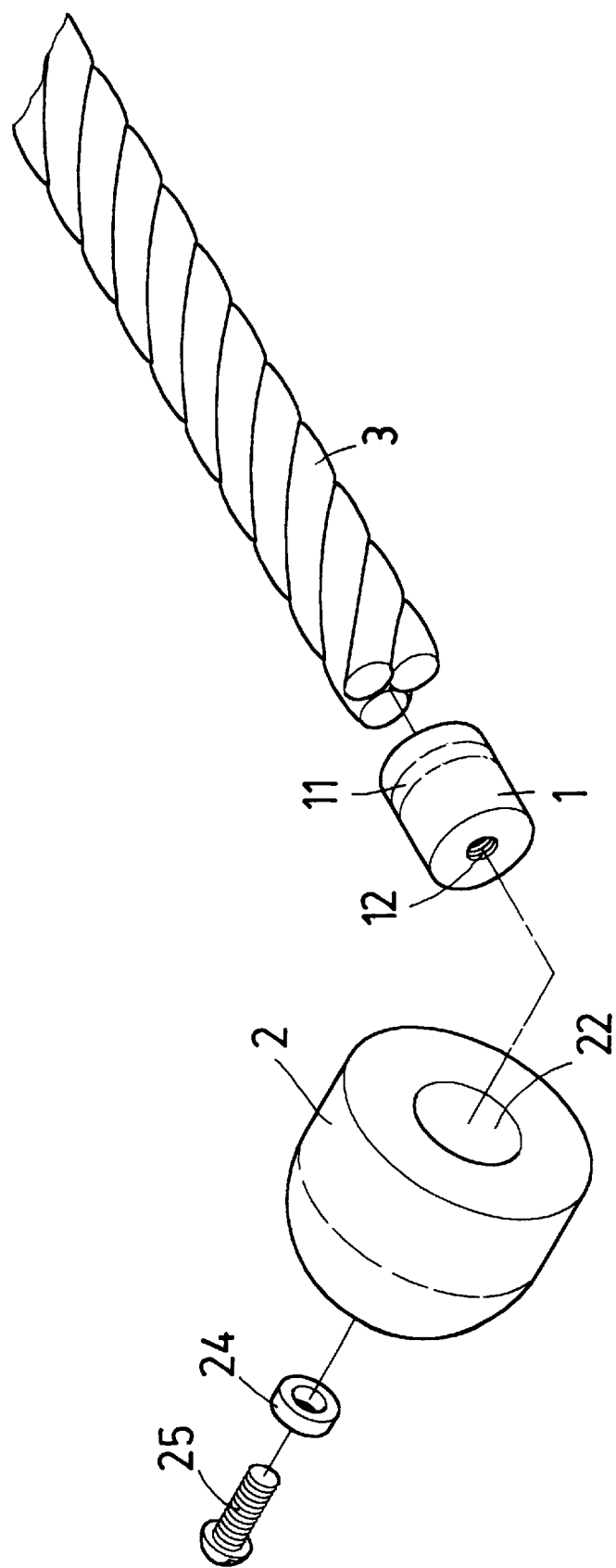
FIG. 1 is a perspective exploded view of the present invention.
Figure 2:
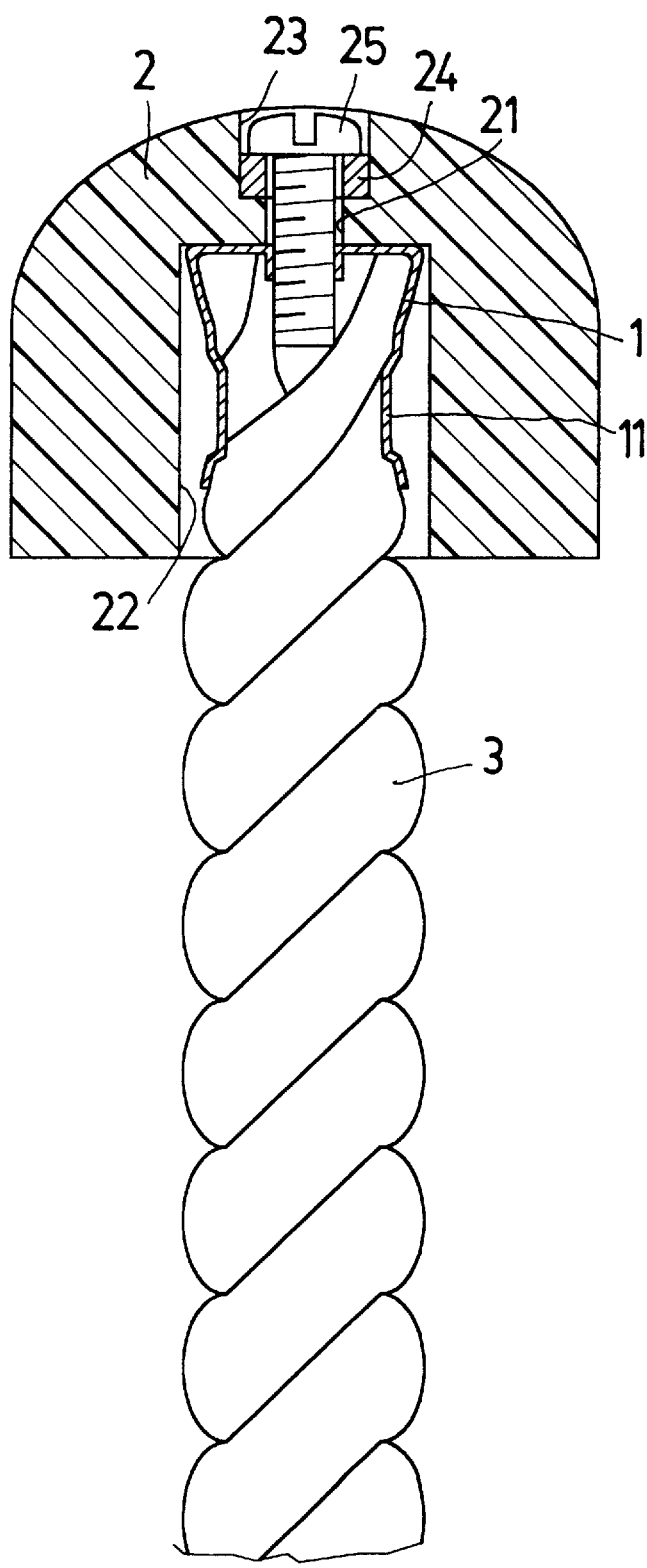
FIG. 2 is a sectional assembled view of the present invention.

Please refer to FIGS. 1 and 2. According to a preferred embodiment, the wrapping structure of the present invention includes an embracing sheath 1 and an end cap 2. The embracing sheath 1 is made of metallic material for embracing an end section of a rope 3. One end of the sheath 1 distal from the end section is embossed to form a binding section 11. The center of the end face of the sheath 1 is formed with an inward extending thread hole 12. The end cap 2 is formed with a through hole 21. One end of the through hole 21 is formed with a large diameter receptacle 22 for receiving the sheath 1 therein. The other end of the through hole 21 is disposed with a fixing section 23 having a diameter larger than that of the through hole 21 while smaller than that of the receptacle 22. A washer 24 is positioned in the fixing section 23 and a bolt 25 is passed through one end of the fixing section 23 and the through hole 21 to be screwed and fixed in the thread hole 12 of the sheath 1 in the receptacle 22.

Referring to FIG. 2, the binding section 11 of the sheath 1 tightly compresses the end section of the rope 3 into a small diameter section. The rope 1 is composed of a bundle of fibers so that when the bolt 25 is screwed into the sheath 1, the fiber bundle of the rope 3 is stretched outward to form an enlarged section. The small diameter section formed by the binding section 11 will exert an axial stopping force onto the enlarged section so that the embracing sheath 1 is tightly bound with the rope 3 without detachment. The bolt 25 is passed through one end of the fixing section 23 of the end cap 2 and the through hole 21 to be screwed into the thread hole 12 of the sheath 1 in the receptacle 22, so that the sheath 1 is firmly associated with the end cap 2. The washer 24 positioned in the fixing section 23 serves to increase the contacting area of the head of the bolt 25 and thus prevent the head of the bolt 25 from sinking into the through hole 21.

Figure 3:
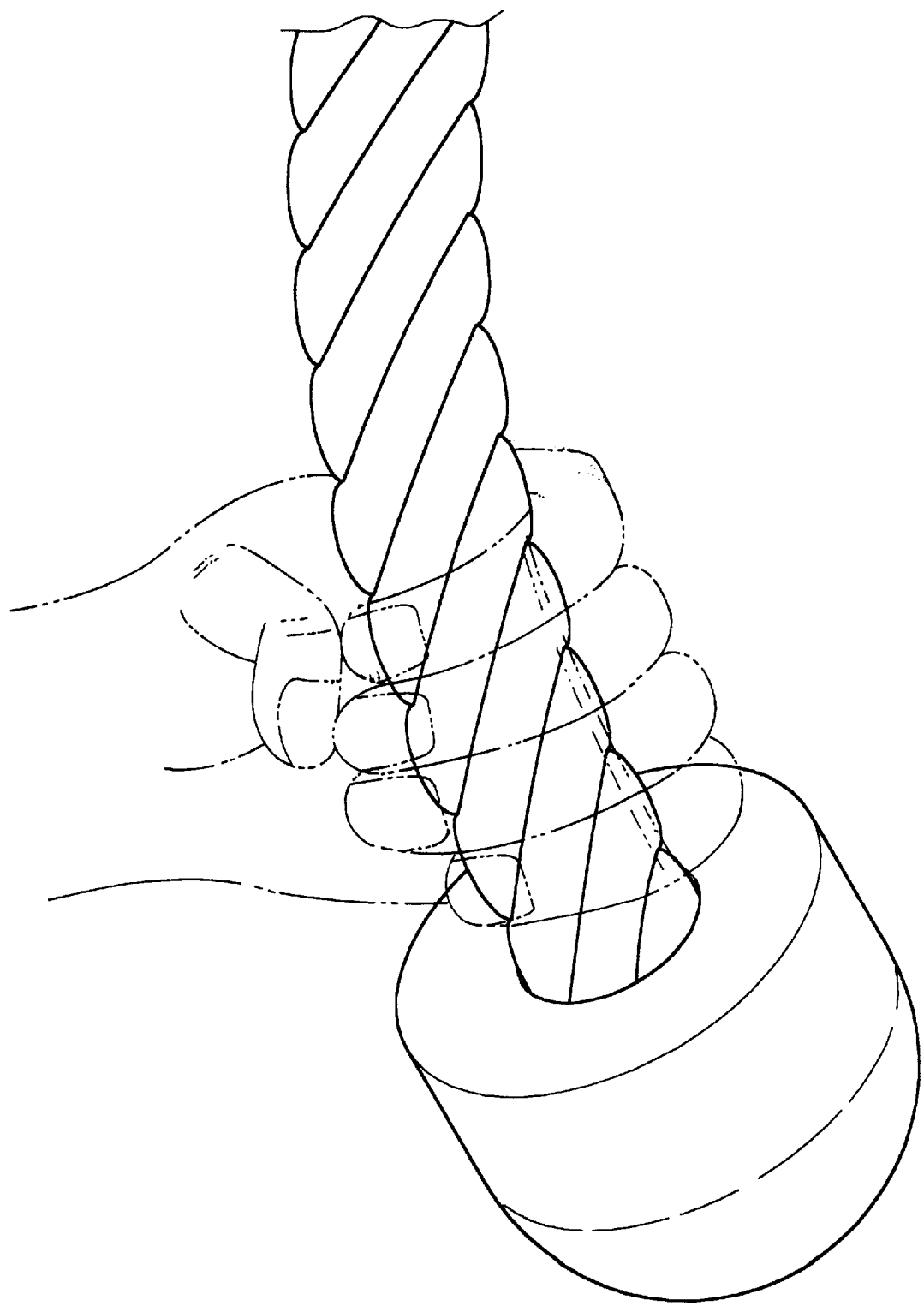
FIG. 3 shows the use of the present invention.
Figure 4:
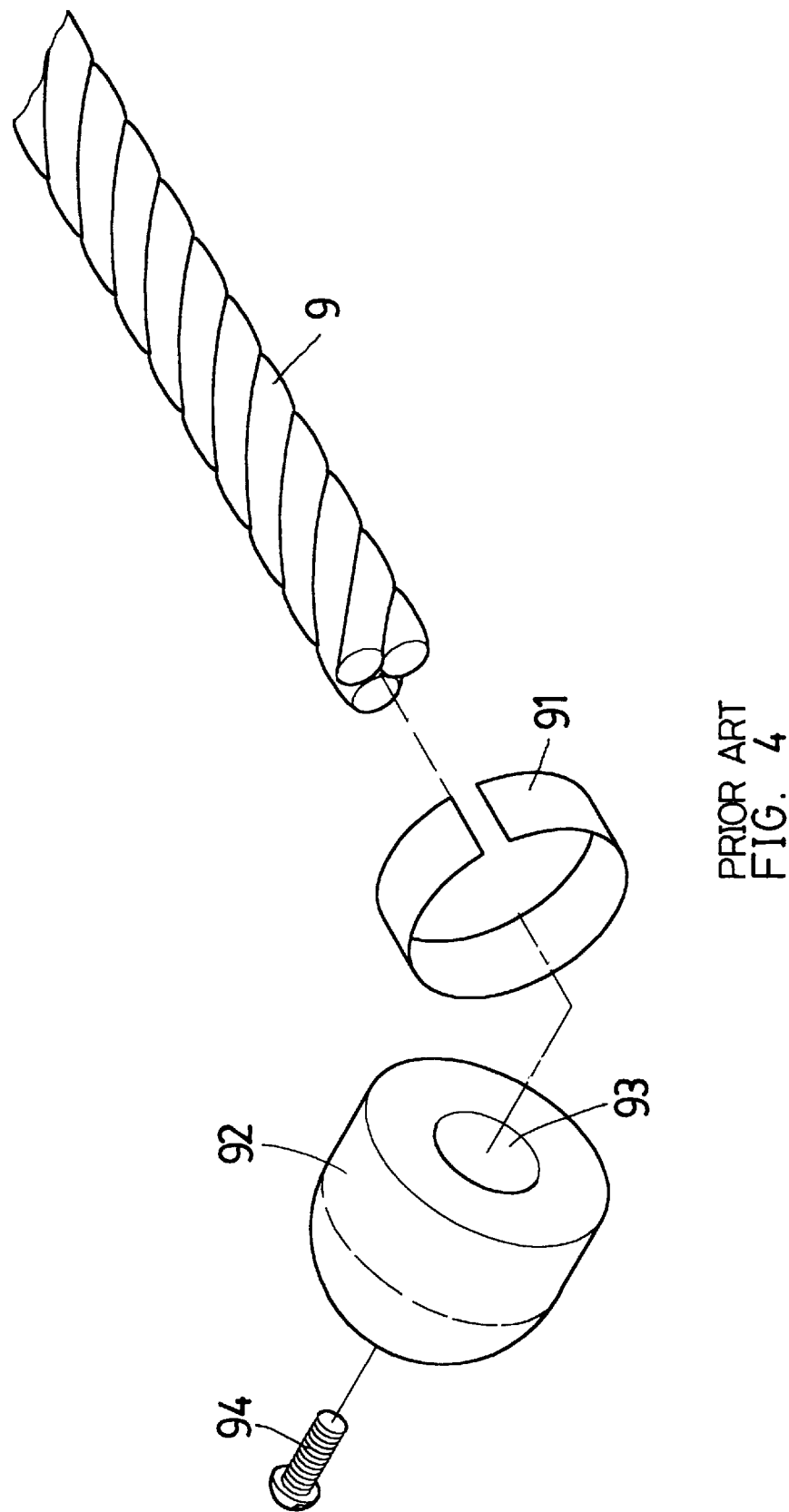
FIG. 4 is a perspective exploded view of a conventional wrapping structure for an end of a rope.
Figure 5:
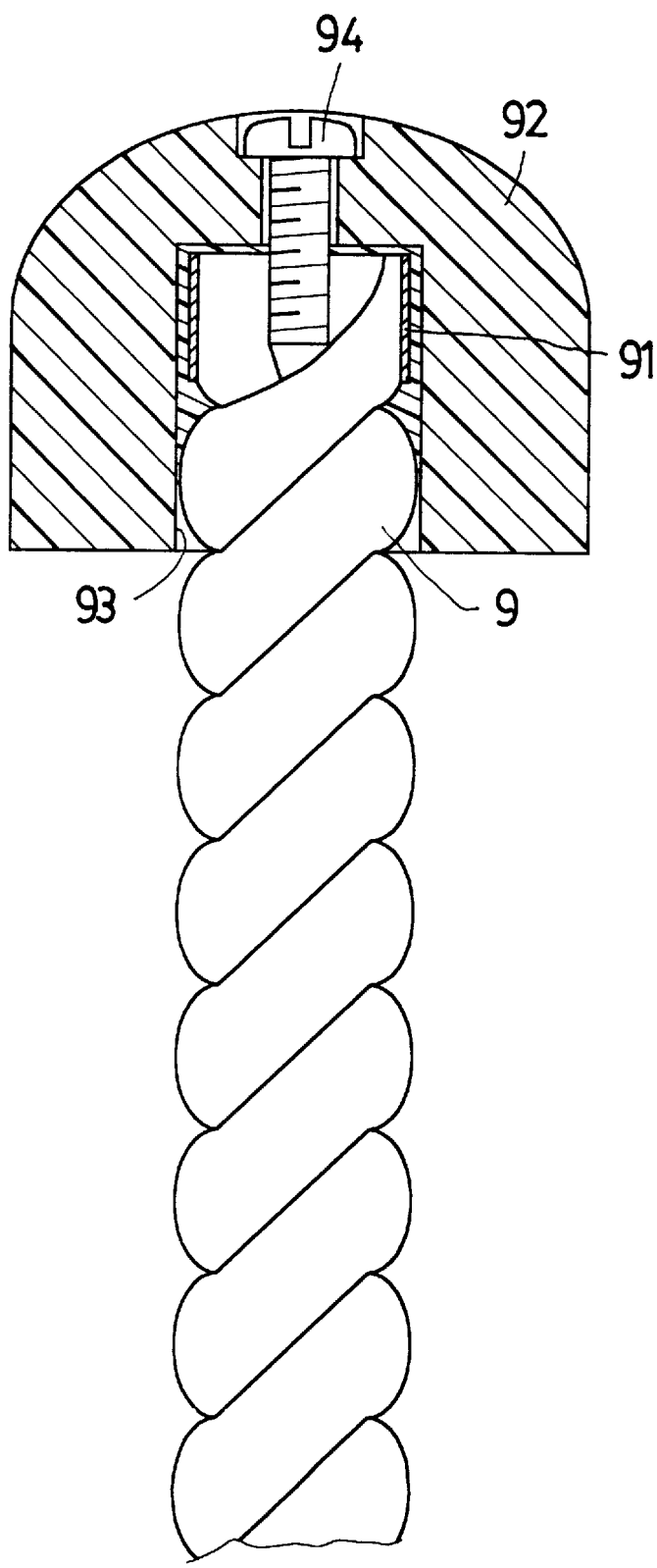
FIG. 5 is a sectional assembled view of the conventional wrapping structure for an end of a rope.

The binding section 11 of the sheath 1 will exert an axial stopping force onto the rope 3 so that the embracing sheath 1 is tightly bound with the end section of the rope 3. When the bolt 25 locks the sheath 1 with the end cap 2, the bolt 25 also provides an axial binding force. Therefore, when a user holds the rope 3, the end cap 2 is able to effectively stop the hand of the user from axially slipping from the rope 3 as shown in FIG. 3.

The above embodiment is only used to illustrate the present invention, not intended to limit the scope thereof. Many modifications of the above embodiment can be made without departing from the spirit of the present invention.

What is claimed is:

1. A wrapping structure for an end of a rope, comprising:
    a longitudinally extended sheath member for embracing an end portion of a rope, said sheath member having a cylindrical contour with an end face on one longitudinal end thereof and an open opposing longitudinal end into which the end portion of the rope is received, said sheath member having a circumferential binding section formed therein, said end face having a centrally located threaded hole formed therethrough;
    an end cap having a hole formed longitudinally therethrough, said end cap having a large diameter receptacle formed in a first longitudinal end thereof in open communication with said through hole for receiving at least a portion of said sheath member therein, said end face being disposed in said receptacle, said end cap having a fixing recess in a second longitudinal end thereof in open communication with said through hole; and, a bolt disposed in said through hole of said end cap and having a head portion located in said fixing recess, said bolt being threadedly engaged with said threaded hole of said sheath for releasable engagement therebetween and extending into end fibers of the rope to expand a corresponding portion thereof within said sheath member.

* * * * *